US010862650B2

(12) United States Patent
Choi et al.

(10) Patent No.: US 10,862,650 B2
(45) Date of Patent: Dec. 8, 2020

(54) METHOD FOR UPLINK COMMUNICATION BY TERMINAL IN MMWAVE COMMUNICATION SYSTEM AND TERMINAL

(71) Applicant: LG ELECTRONICS INC., Seoul (KR)

(72) Inventors: Kukheon Choi, Seoul (KR); Hyunsoo Ko, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 12 days.

(21) Appl. No.: 16/098,395

(22) PCT Filed: Jun. 8, 2016

(86) PCT No.: PCT/KR2016/006064
§ 371 (c)(1),
(2) Date: Nov. 1, 2018

(87) PCT Pub. No.: WO2017/213275
PCT Pub. Date: Dec. 14, 2017

(65) Prior Publication Data
US 2019/0165917 A1 May 30, 2019

(51) Int. Cl.
*H04L 5/00* (2006.01)
*H04W 88/08* (2009.01)
(Continued)

(52) U.S. Cl.
CPC .......... *H04L 5/0055* (2013.01); *H04L 1/1812* (2013.01); *H04L 5/0048* (2013.01);
(Continued)

(58) Field of Classification Search
CPC ... H04L 1/1812; H04L 1/1854; H04L 1/1896; H04L 27/2607; H04L 5/0055; H04L 27/2602; H04W 72/0446; H04W 88/08
(Continued)

(56) References Cited

U.S. PATENT DOCUMENTS

| 2011/0182174 A1 | 7/2011 | Pi et al. |
| 2014/0226607 A1 | 8/2014 | Holma et al. |

(Continued)

FOREIGN PATENT DOCUMENTS

| WO | 2015109153 | 7/2015 |
| WO | 2016043563 | 3/2016 |

OTHER PUBLICATIONS

PCT International Application No. PCT/KR2016/006064, Written Opinion of the International Searching Authority dated Feb. 24, 2017, 15 pages.

(Continued)

*Primary Examiner* — Mark H Rinehart
*Assistant Examiner* — Kokou R Detse
(74) *Attorney, Agent, or Firm* — Lee Hong Degerman Kang Waimey

(57) ABSTRACT

Disclosed is an uplink communication method for: receiving data through an mmWave downlink from an mmWave base station; transmitting, to the mmWave base station, an ACK/NACK reply to the data and an mmWave uplink reference signal through an mmWave uplink; receiving, from the mmWave base station, an indicator indicating use of a legacy uplink instead of the mmWave uplink; shortening the length of a legacy TTI to correspond to the length of an mmWave TTI according to the indicator; and communicating with the mmWave base station through the legacy uplink using the shortened legacy TTI.

8 Claims, 19 Drawing Sheets

(51) Int. Cl.
  *H04L 27/26* (2006.01)
  *H04W 76/11* (2018.01)
  *H04L 1/18* (2006.01)
  *H04W 72/04* (2009.01)

(52) U.S. Cl.
  CPC .......... *H04L 5/0051* (2013.01); *H04L 5/0094* (2013.01); *H04L 27/2602* (2013.01); *H04L 27/2607* (2013.01); *H04W 72/0446* (2013.01); *H04W 76/11* (2018.02); *H04W 88/08* (2013.01); *H04L 5/0007* (2013.01)

(58) Field of Classification Search
  USPC ........................................................ 370/329
  See application file for complete search history.

(56) References Cited

U.S. PATENT DOCUMENTS

| | | | |
|---|---|---|---|
| 2015/0311931 A1* | 10/2015 | Rozental | H04B 1/123 375/343 |
| 2016/0192433 A1* | 6/2016 | Deenoo | H04W 76/28 370/329 |
| 2017/0215179 A1* | 7/2017 | Choi | H04L 1/0026 |
| 2017/0238305 A1* | 8/2017 | Chen | H04W 72/0413 370/311 |

OTHER PUBLICATIONS

KDDI, "Discussion on PUCCH design for shortened TTI", 3GPP TSG RAN WG1 Meeting #85, R1-165267, May 2016, 3 pages.

* cited by examiner

FIG. 2
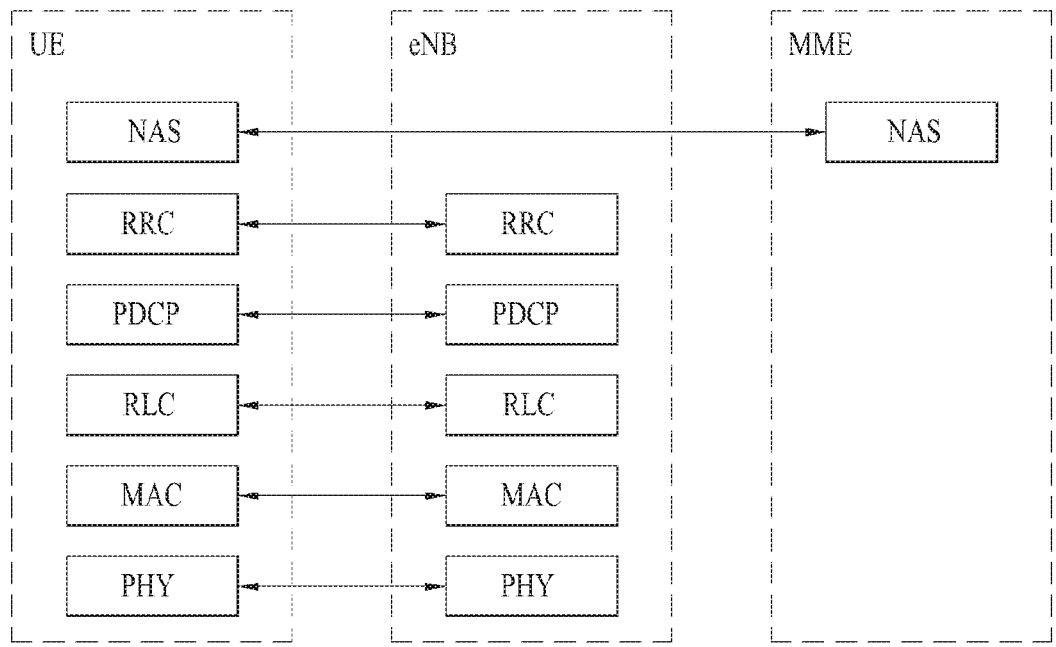
(a) Control-plane protocol stack
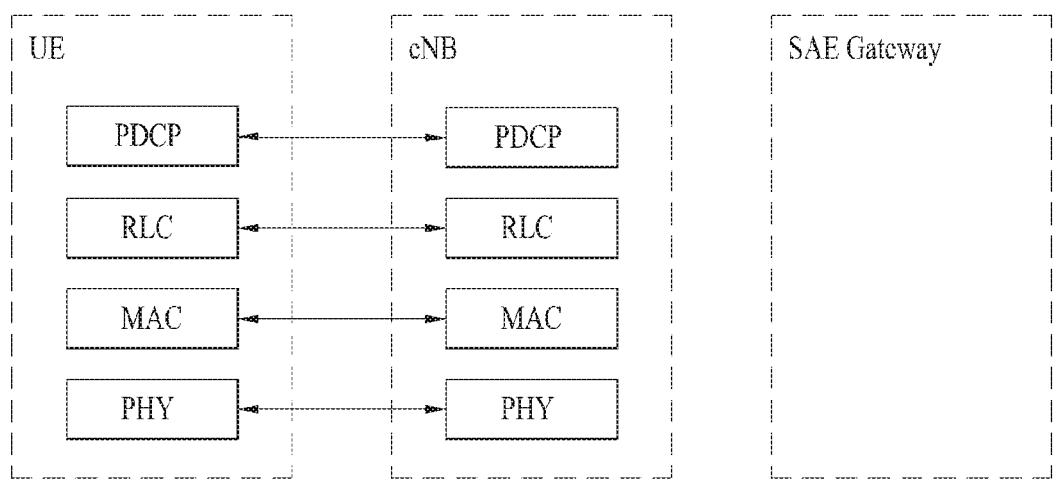
(b) User-plane protocol stack mmWave BS    mmWave UE (a)                              (b)

METHOD FOR UPLINK COMMUNICATION BY TERMINAL IN MMWAVE COMMUNICATION SYSTEM AND TERMINAL

CROSS-REFERENCE TO RELATED APPLICATIONS

This application is the National Stage filing under 35 U.S.C. 371 of International Application No. PCT/KR2016/006064, filed on Jun. 8, 2016, the contents of which are hereby incorporated by reference herein its entirety.

TECHNICAL FIELD

The present invention relates to a wireless communication system, and more particularly, to a method of uplink communication from a user equipment to a base station in an mmWave communication system.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system or LTE-A (LTE-Advanced) system. Details of the technical specifications of the UMTS and E-UMTS may be understood with reference to Release 7 to Release 13 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE-A, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

One technical task of the present invention is to propose a stable communication mechanism between a User Equipment (UE) and a Base Station (BS) in an mmWave communication system that uses an ultra-high frequency band.

Another technical task of the present invention is to maintain mmWave communication stably even if a channel state of an mmWave Uplink (UL) band is not good.

Further technical task of the present invention is to minimize degradation of a yield and a data requirement in a manner of adaptively utilizing a legacy UL band.

The technical problems solved by the present invention are not limited to the above technical problems and other technical problems which are not described herein will become apparent to those skilled in the art from the following description.

Technical Solutions

In one technical aspect of the present invention, provided herein is a method of performing uplink communication by a user equipment supportive of an mmWave communication system, the method including receiving data through an mmWave downlink from an mmWave base station, transmitting an ACKnowledgement/Negative ACK (ACK/NACK) response for the data and an mmWave uplink reference signal to the mmWave base station through an mmWave uplink, receiving an indicator instructing to use a legacy uplink instead of the mmWave uplink from the mmWave base station, shortening a length of a legacy Transmission Time Interval (TTI) to match up with a length of an mmWave TTI according to the indicator, and performing communication with the mmWave base station through the legacy uplink using the shortened legacy TTI.

The indicator may include at least one of a flag indicating to use the legacy uplink, a flag indicating to shorten the legacy TTI, and information on the length of the mmWave TTI.

The legacy uplink may be used according to a channel state of the mmWave uplink measured by the mmWave base station using the mmWave uplink reference signal.

The mmWave base station may be collocated with a legacy base station and the user equipment may have capability of accessing both a connection to the mmWave base station and a connection to the legacy base station.

The mmWave TTI may be implemented to be an integer multiple of the length of the mmWave TTI.

An ACK/NACK response for legacy downlink data received in the course of performing the uplink communication using the shortened legacy TTI may be transmitted by being bundled after ending a use of the shortened legacy TTI.

In another technical aspect of the present invention, provided herein is a user equipment supportive of an mmWave communication system, the user equipment including a transmitting unit, a receiving unit, and a processor configured to operate by being connected to the transmitter and the receiver, wherein the processor is further configured to control the receiver to receive data through an mmWave downlink from an mmWave base station, control the transmitter to transmit an ACKnowledgement/Negative ACK (ACK/NACK) response for the data and an mmWave uplink reference signal to the mmWave base station through an mmWave uplink, control the receiver to receive an indicator instructing to use a legacy uplink instead of the mmWave uplink from the mmWave base station, shorten a length of a legacy Transmission Time Interval (TTI) to match up with a length of an mmWave TTI according to the indicator, and control the transmitter and the receiver to perform communication with the mmWave base station through the legacy uplink using the shortened legacy TTI.

Advantageous Effects

According to embodiments of the present invention, the following effects are expected.

First of all, although a rapid channel change occurs in an mmWave communication system, efficient communication between a UE and a BS is enabled.

Secondly, by adaptively utilizing a legacy Uplink (UL), communication can be stably maintained despite that an mmWave UL band is unstable.

Thirdly, as a resource is efficiently used by adjusting a length of a legacy TTI, degradation of a yield and a data requirement can be minimized.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

FIG. 2 illustrates structures of control and user planes of a radio interface protocol between a user equipment and E-UTRAN based on 3GPP radio access network standard.

BEST MODE FOR INVENTION

Figure 1:
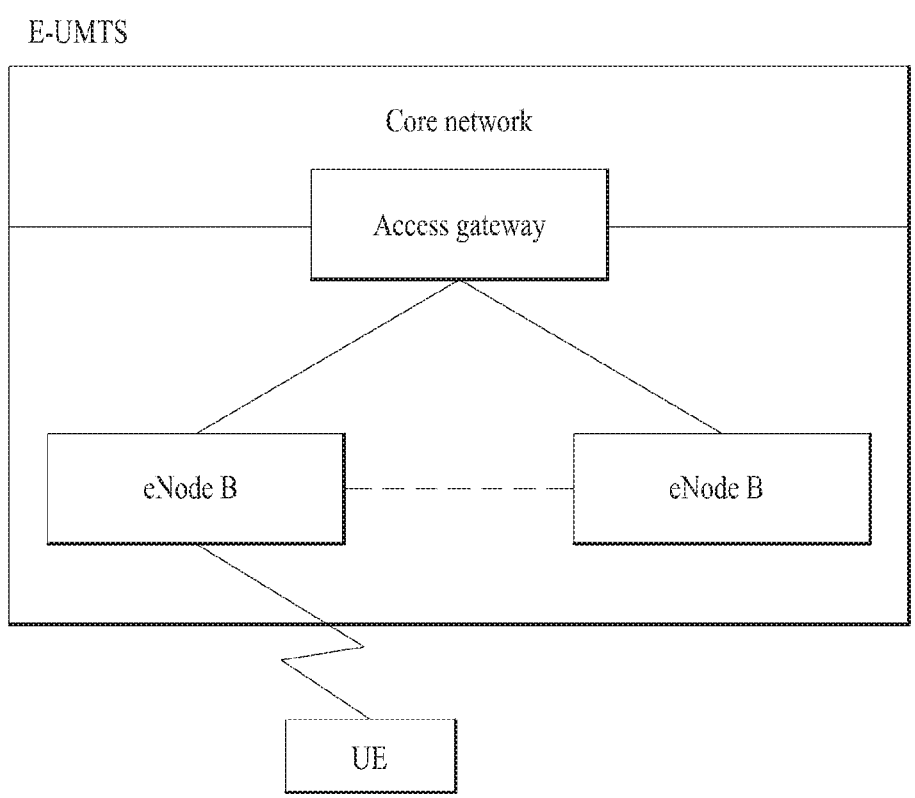
FIG. 1 is a schematic diagram of an E-UMTS network structure as one example of a wireless communication system.

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

1. LTE/LTE-A System Overview

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
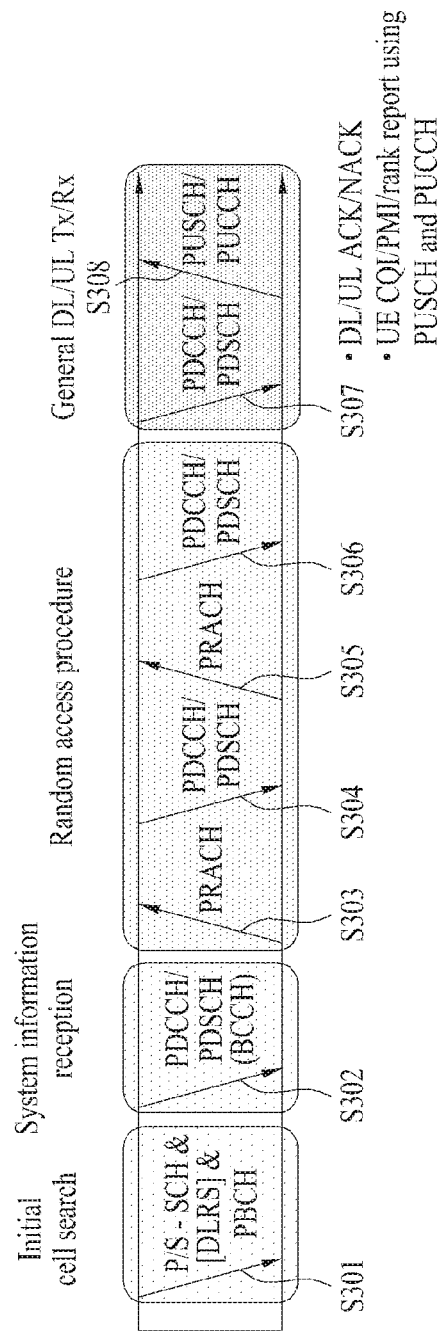
FIG. 3 illustrates physical channels used for a 3GPP LTE system and a general signal transmission method using the same.

FIG. 3 is a diagram illustrating physical channels used in a 3GPP LTE/LTE-A system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
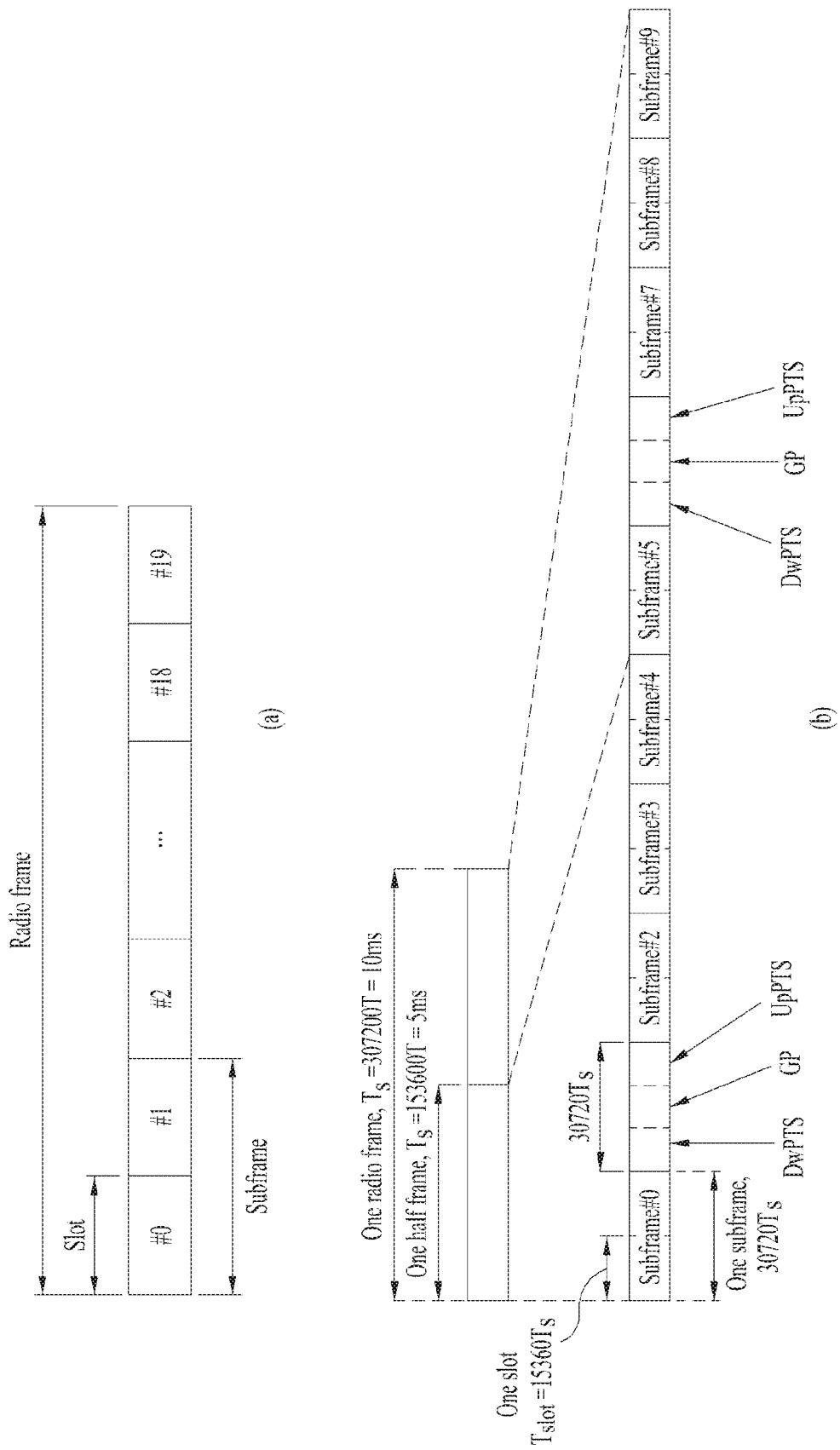
FIG. 4 illustrates a structure of a radio frame used in an LTE/LTE-A system.

FIG. 4 is a diagram illustrating a structure of a radio frame used in an LTE/LTE-A system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| | | Normal cyclic prefix in downlink | | Extended cyclic prefix in downlink | | |
|---|---|---|---|---|---|---|
| | | UpPTS | | | UpPTS | |
| | | Normal | Extended | | | |
| Special subframe configuration | DwPTS | cyclic prefix in uplink | cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |

TABLE 1-continued

| | Normal cyclic prefix in downlink | | | Extended cyclic prefix in downlink | | |
|---|---|---|---|---|---|---|
| | | UpPTS | | | UpPTS | |
| | | Normal | Extended | | Normal cyclic | Extended cyclic |
| Special subframe configuration | DwPTS | cyclic prefix in uplink | cyclic prefix in uplink | DwPTS | prefix in uplink | prefix in uplink |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
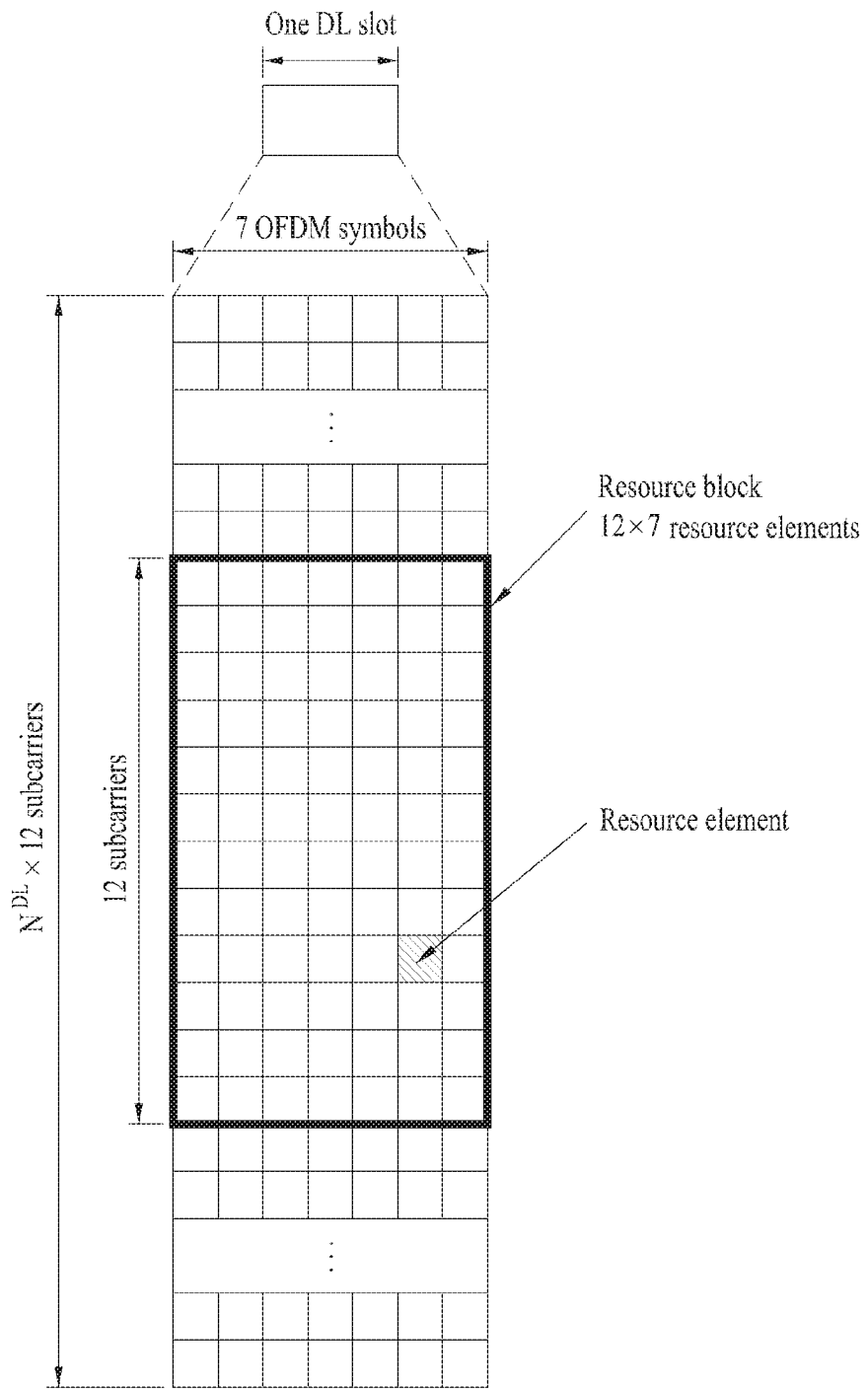
FIG. 5 illustrates a resource grid for a downlink slot.

FIG. 5 illustrates a resource grid for a DL slot.

Referring to FIG. 5, a DL slot includes $N_{symb}^{DL}$ OFDM symbols in the time domain an $N_{RB}^{DL}$ resource blocks (RBs) in the frequency domain. Since each RB includes $N_{sc}^{DL}$ subcarriers, a DL slot includes $N_{RB}^{DL} \times N_{sc}^{DL}$ subcarriers in the frequency domain. While FIG. 5 illustrates that a DL slot includes 7 OFDM symbols and an RB includes 12 subcarriers, embodiments of the present invention are not limited thereto. For example, the number of OFDM symbols included in a DL slot may be changed according to the length of a cyclic prefix (CP).

Each element in the resource grid is referred to as a resource element (RE). Each RE is indicated by an OFDM symbol index and a subcarrier index. One RB consists of $N_{RB}^{DL} \times N_{sc}^{DL}$ REs. The number of RBs ($N_{RB}^{DL}$) included in a DL slot depends on a DL transmission bandwidth set in a cell.

Figure 6:
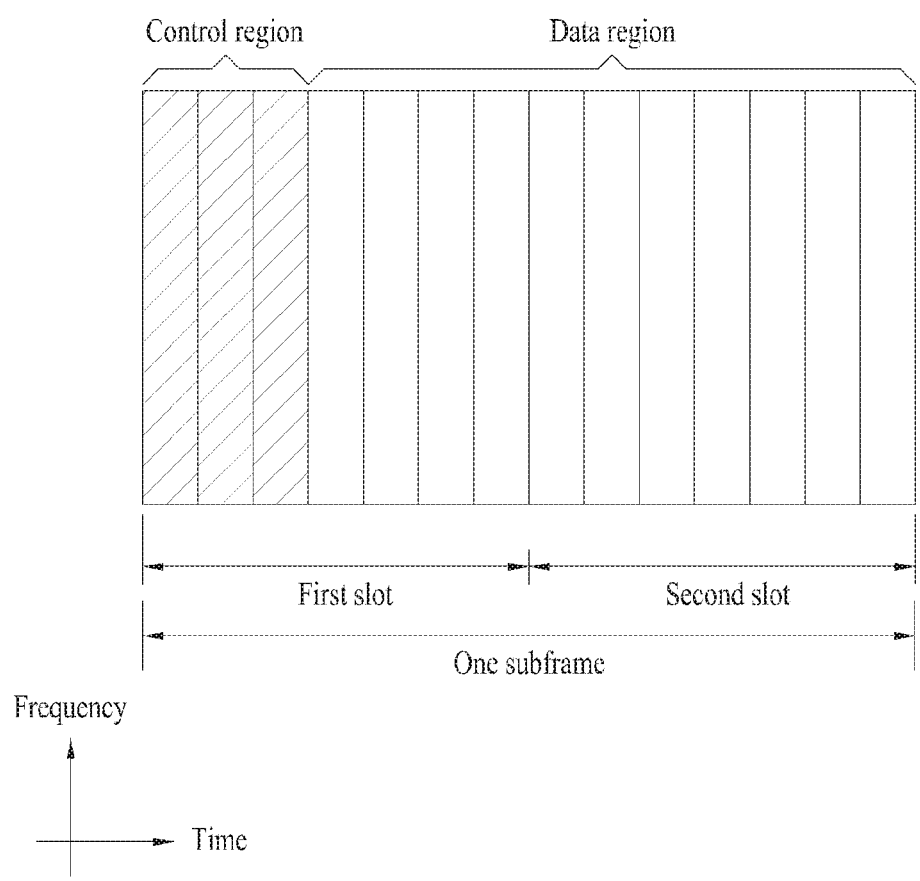
FIG. 6 illustrates a structure of a downlink subframe.

FIG. 6 illustrates the structure of a DL subframe.

Referring to FIG. 6, up to three or four OFDM symbols positioned at the front part of the first slot in a subframe correspond to a control region to which control channels are allocated. The other OFDM symbols in the subframe correspond to a data region to which a physical downlink shared channel (PDSCH) is allocated. Examples of the aquifer channels used in LTE include a physical control format indicator channel (PCFICH), a physical downlink control channel (PDCCH), and a physical hybrid ARQ indicator channel (PHICH). The PCFICH is transmitted in the first OFDM symbol of a subframe, carrying information about the number of OFDM symbols used for transmission of control channels in the subframe. The PHICH carries a HARQ acknowledgment (ACK)/negative-acknowledgment (NACK) signal in response to UL transmission HARQ ACK/NACK.

Control information carried on the PDCCH is called downlink control information (DCI). The DCI includes resource allocation information and other control information for a UE or a UE group. For example, the DCI includes DL/UL scheduling information, UL transmit (Tx) power control commands, etc.

The PDCCH carries information about resource allocation and a transmission format for a downlink shared channel (DL-SCH), information about resource allocation and a transmission format for an uplink shared channel (UL-SCH), paging information on a paging channel (PCH), system information on the DL-SCH, information about resource allocation for a higher-layer control message such as a random access response transmitted on the PDSCH, a Tx power control command set for individual UEs in a UE group, Tx power control commands, voice over Internet protocol (VoIP) activation indication information, etc. A plurality of PDCCHs may be transmitted in the control region. A UE may monitor a plurality of PDCCHs. A PDCCH is transmitted on an aggregation of one or more consecutive control channel elements (CCEs). A CCE is a logical allocation unit used to provide a PDCCH with a coding rate based on the state of a radio channel. A CCE corresponds to a plurality of resource element groups (REGs). The format of a PDCCH and the number of PDCCH bits are determined according to the number of CCEs. An eNB determines a PDCCH format according to DCI transmitted to a UE and adds cyclic redundancy check (CRC) to control information. The CRC is masked with an identifier (ID) (e.g. a radio network temporary identifier (RNTI)) according to the owner or use of the PDCCH. For example, if the PDCCH is intended for a specific UE, the CRC may be masked with the ID (e.g., cell-RNTI (C-RNTI)) of the specific UE. If the PDCCH is intended for a paging message, the CRC thereof may be masked with a paging ID (e.g., paging-RNTI (P-RNTI)). If the PDCCH is intended for system information (particularly, a system information block (SIB)), the CRC thereof may be masked with a system information RNTI (SI-RNTI). If the PDCCH is intended for a random access response, the CRC thereof may be masked with a random access-RNTI (RA-RNTI).

Figure 7:
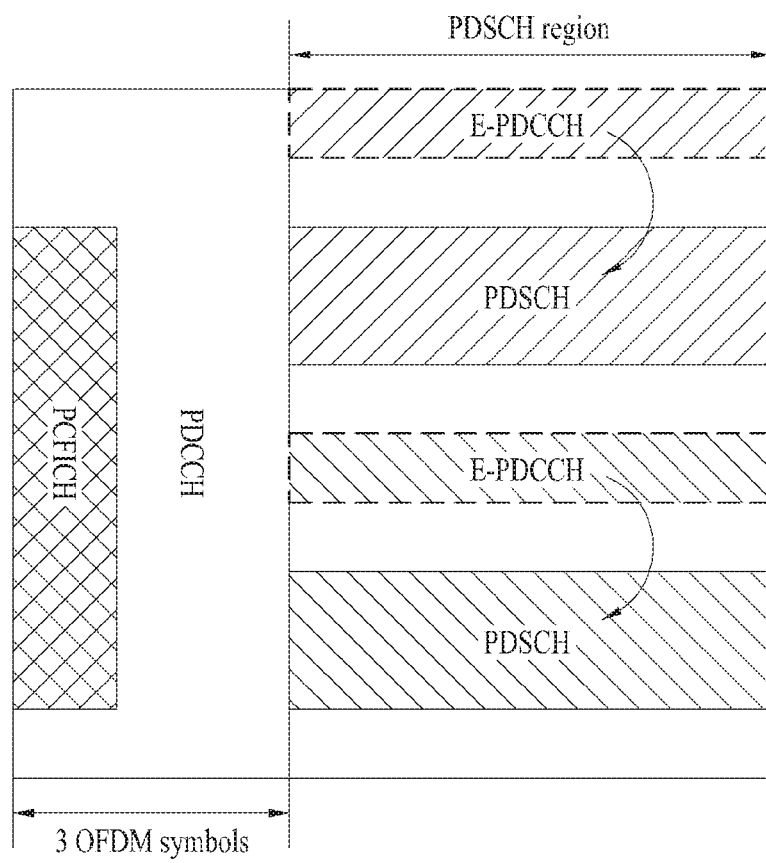
FIG. 7 illustrates EPDCCH and PDSCH scheduled by the EPDCCH.

FIG. 7 illustrates EPDCCH and PDSCH scheduled by the EPDCCH.

Referring to FIG. 7, in general, EPDCCH can be used by defining a portion of a PDSCH region for transmitting data and a user equipment should perform a blind decoding procedure for detecting whether EPDCCH of the user equipment is present. If the number of user equipment that access a node such as RRH while performing the same scheduling operation (i.e., PDSCH and PUSCH control) as legacy PDCCH, a large number of EPDCCHs are allocated to the PDSCH region, whereby the number of times of blind decoding to be performed by the user equipments is increased. Thus, the EPDCCH may have a disadvantage.

2. mmWave Communication System

Figure 8:
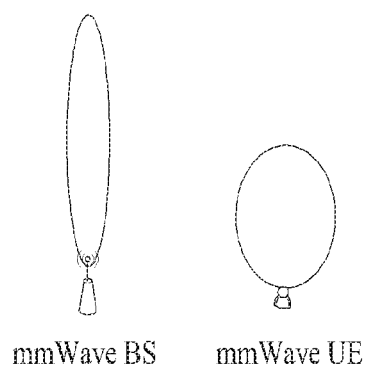
FIG. 8 illustrates beamforming capabilities of a BS and UE supportive of an mmWave system.
Figure 9:
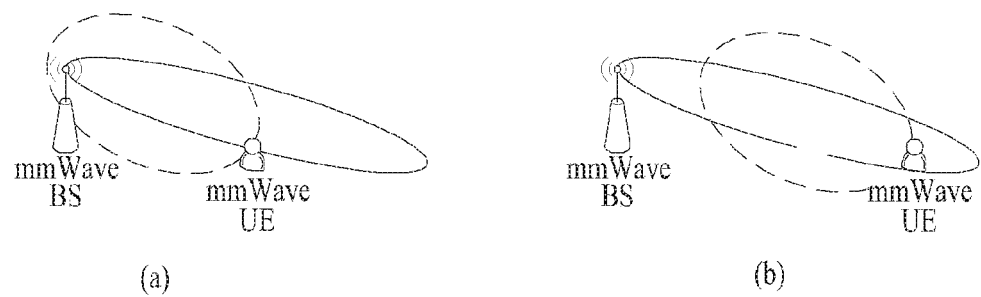
FIG. 9 illustrates problems due to beamforming capabilities of a BS and UE.

FIG. 8 illustrates beamforming capabilities of a BS and UE supportive of an mmWave system. FIG. 9 illustrates problems due to beamforming capabilities of a BS and UE.

Referring to FIG. 8, an mmWave BS forms a Transmitted (Tx) beam thinner than that of an mmWave UE through beamforming using a massive MIMO antenna. On the other hand, since a UE is configured to have antennas relatively less than that of a BS, the UE has beamforming capability of forming a Tx beam not thinner than that of the BS.

Considering such a point, a problem shown in FIG. 9 may be caused. Referring to FIG. 9(a), if a UE is located within a Tx beam range of an mmWave BS and the mmWave BS exists in a Tx beam range of the UE, communication in mmWave UL/DL is possible between the BS and the UE. In such a case, no problem is caused to mmWave UL feedback of the UE.

Yet, referring to FIG. 9(b), although the UE is located in the Tx beam range of the mmWave BS, if the mmWave BS does not exist in the Tx beam range of the UE, transmission in mmWave DL is possible but mmWave UL transmission is impossible.

In an indoor situation that a distance between a BS and a UE is relatively short, a probability that a problem is caused to mmWave UL/DL communication is low. On the contrary, in an outdoor situation, as a probability that the problem shown in FIG. 9(b) is caused is relatively high, a problem may be caused. Moreover, while the BS and the UE are communicating with each other in mmWave UL and mmWave DL in the situation shown in FIG. 9(a), as the UE moves, the situation shown in FIG. 9(a) may be switched to the situation shown in FIG. 9(b). In this case, the communication should be performed by switching to mmWave DL and legacy UL.

Figure 10:
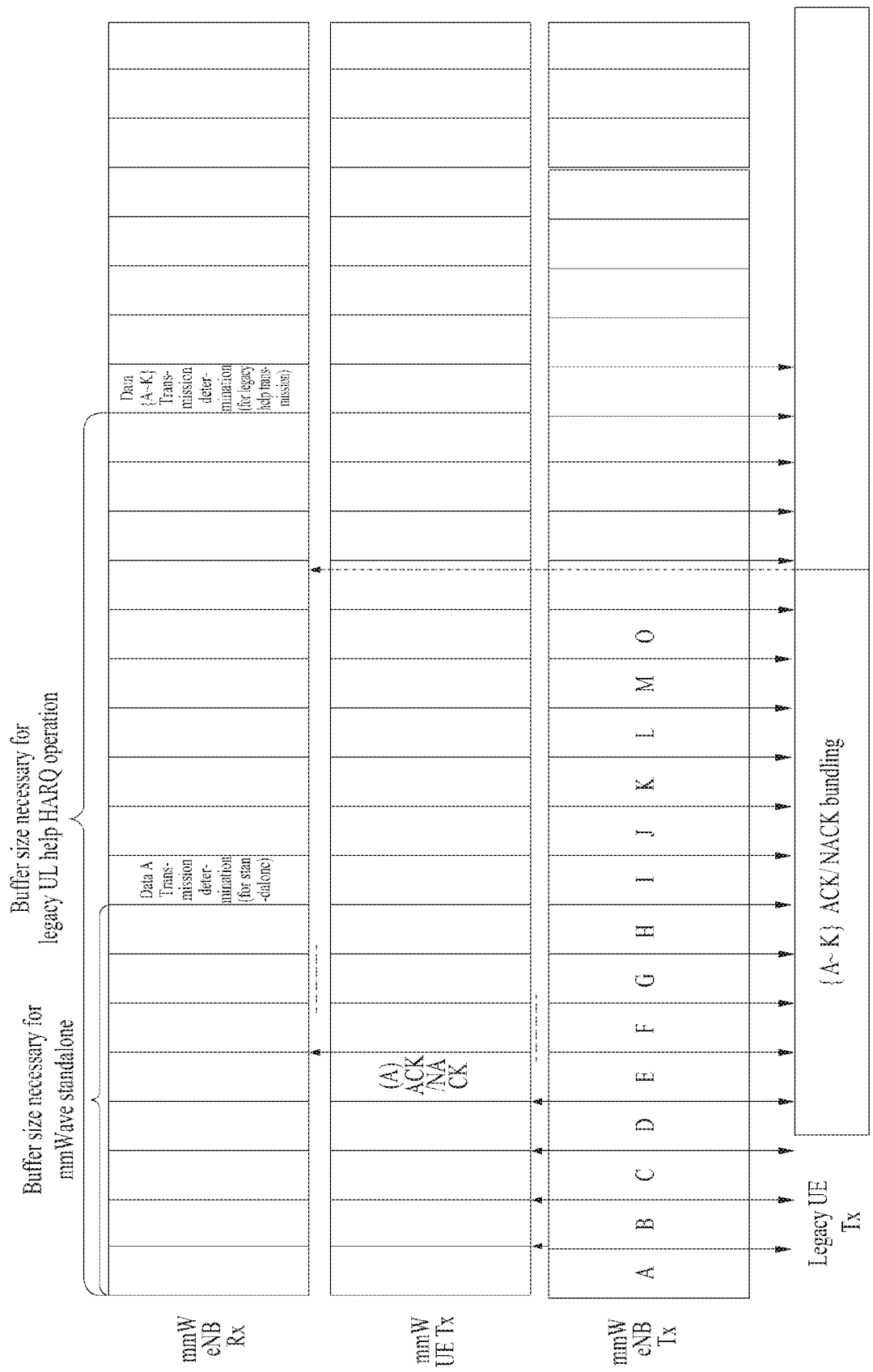
FIG. 10 illustrates a buffer size excess phenomenon when an mmWave Downlink (DL) and a legacy UL are used together in case of HARQ transmission.

FIG. 10 illustrates a buffer size excess phenomenon when an mmWave Downlink (DL) and a legacy UL are used together in case of HARQ transmission.

Assume a case that an mmWave connection and a legacy connection coexist while mmWave UL/DL and legacy UL/DL operate stand-alone. And, assume a case that an HARQ process is performed across 8 TTIs. In doing so, a TTI of a legacy system does not coincide with a TTI of an mmWave system and the TTI of the legacy system is relatively longer in general. Hence, if a UE transmits ACK/NACK in legacy UL, the UE needs to have more buffers due to the TTI length difference between the legacy system and the mmWave system in order to perform normal HARQ.

In some implementations, if each of an mmWave system and a legacy system operates independently, any problem may not be caused. Yet, since an mmWave connection has stability relatively lower than that of a legacy connection, it may be preferable to use a legacy UL for HARQ transmission. In order to use the legacy UL, it is able to consider a method of increasing a buffer size of the mmWave system, a method of adjusting ACK/NACK transmission to match up with a buffer size, or a method of increasing an mmWave TTI to match up with a legacy TTI, and the like. Since the buffer size adjusting method among the above methods is an implementation issue of a UE, the two remaining methods are described as follows.

Figure 11:
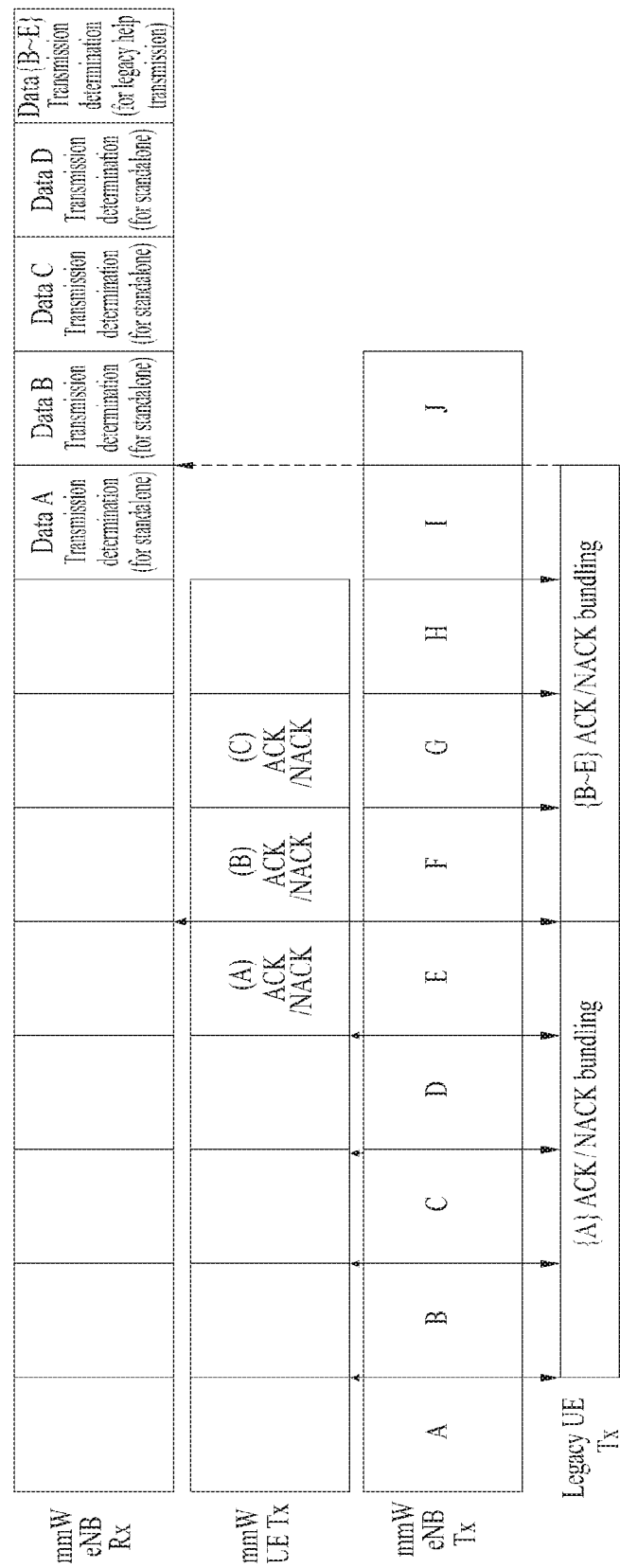
FIG. 11 illustrates a content of adjusting a TTI ratio between an mmWave system and a legacy system in case of HARQ transmission.

First of all, a method of adjusting an mmWave TTI to match up with a legacy TTI is described. FIG. 11 illustrates a content of adjusting a TTI ratio between an mmWave system and a legacy system in case of HARQ transmission. FIG. 11 shows a case that a ratio of an mmWave TTI to a legacy TTI is 4:1, i.e., a case that the legacy TTI has a length four times longer than that of the mmWave TTI.

FIG. 11 shows a process for transmitting ACK/NACK in legacy UL. When a TTI is designed by pre-considering a situation of adjusting an mmWave TTI to match up with a legacy TTI, even if a legacy UL is used together with an mmWave DL, a buffer size excess problem is not caused. So to speak, a buffer amounting to an mmWave processing delay time (e.g., 3 TTIs in FIG. 11) is required additionally. Yet, in such a case, there is a loss of a system yield configured by focusing on the existing mmWave UL link. Hence, the method described with reference to FIG. 11 may be considerable restriction in a situation that a targeted data transmission rate should be achieved.

Figure 12:
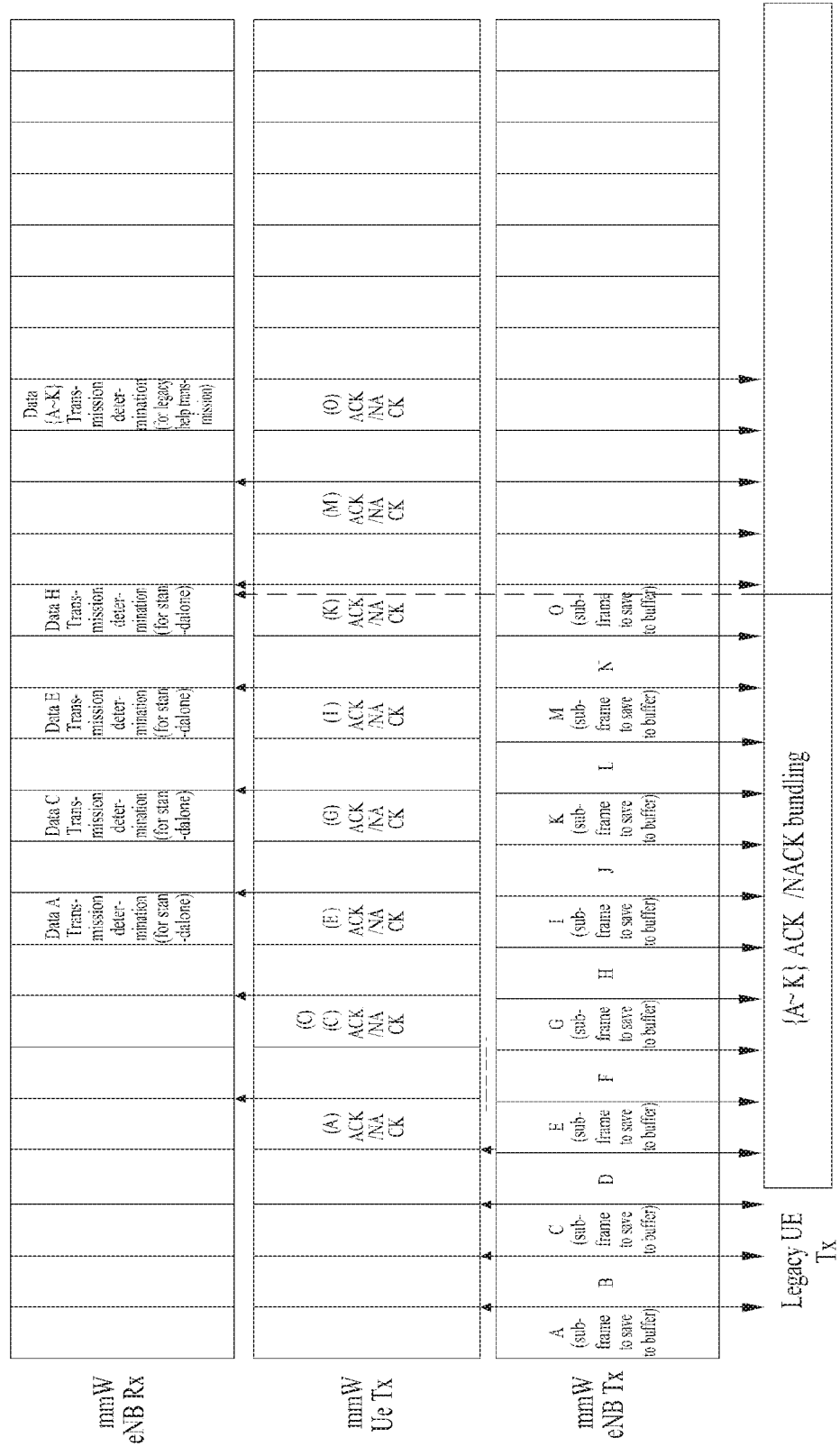
FIG. 12 illustrates a content of transmitting some mmWave ACK/NACK in legacy UL in case of HARQ transmission.

Described with reference to FIG. 12 is a method of adjusting ACK/NACK transmission to match up with a buffer size in the course of using a legacy UL. FIG. 12 illustrates a content of transmitting some mmWave ACK/NACK in legacy UL in case of HARQ transmission.

The method described with reference to FIG. 12 relates to a method of adaptively setting an ACK/NACK transmission requested mmWave TTI according to a buffer state and performing UL transmission at robust Modulation and Coding Scheme (MCS) level in the rest of TTIs. Through such a method, it is possible to use a legacy UL flexibly according to an mmWave channel state and solve a maximum buffer problem. Moreover, it is unnecessary to adjust a preset mmWave TTI and a loss of a data requirement of a system is small. Yet, in case of failing in transmission of bundled ACK/NACK, it may cause a problem that all the bundled data should be sent back. Moreover, since transmission in legacy UL is partially performed, implementation complexity rises.

3. UL Communication Method in Proposed mmWave System

Figure 13:
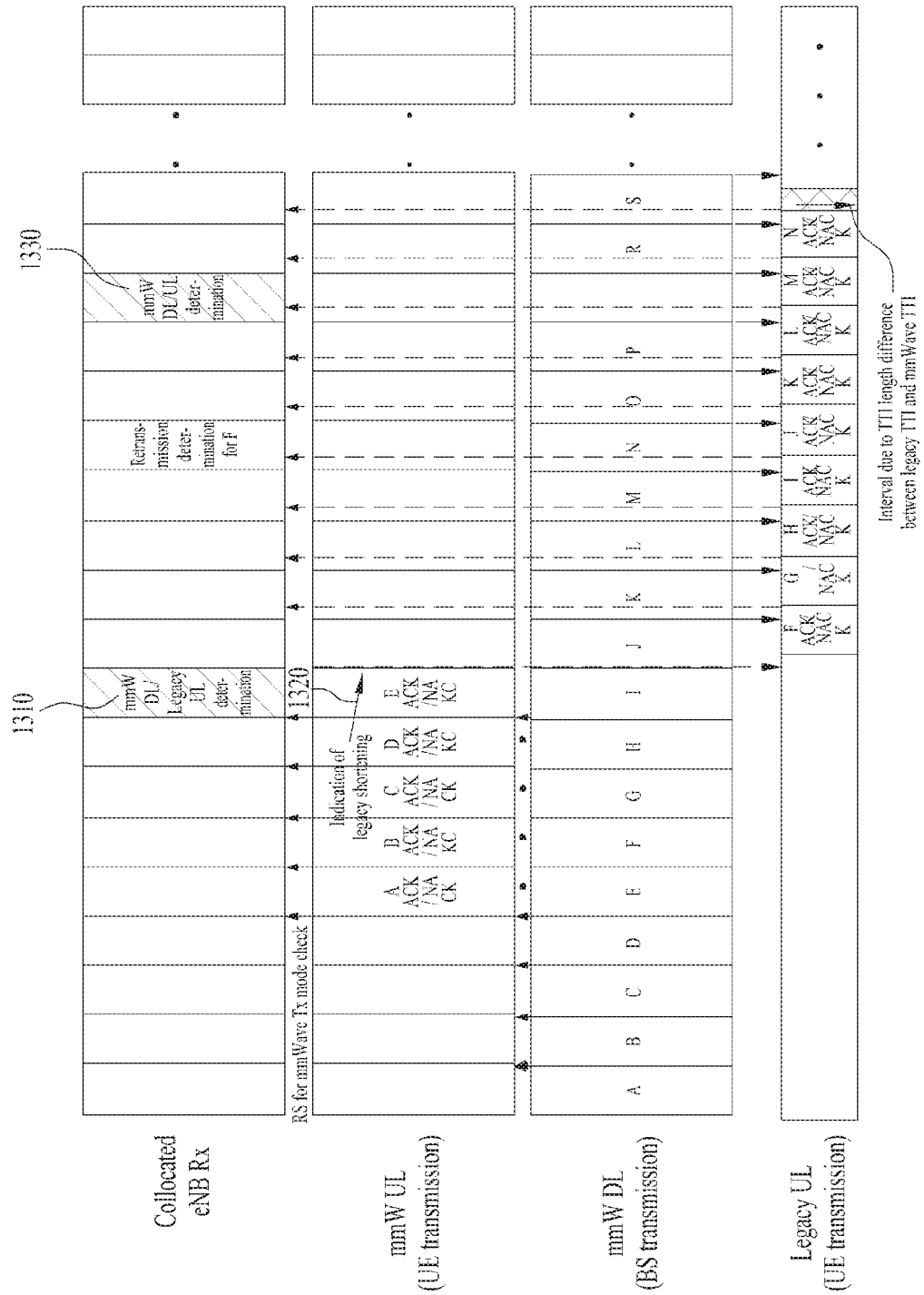
FIG. 13 illustrates a process for transmitting UL feedback by shortening a legacy TTI adaptively according to a proposed embodiment.

FIG. 13 illustrates a method of shortening a legacy TTI adaptively in the course of transmitting UL feedback according to a proposed embodiment. Proposed in FIG. 13 is an embodiment of maintaining a targeted data transmission rate in an mmWave system while maintaining a buffer state for an mmWave DL.

First of all, according to an embodiment shown in FIG. 13, a legacy BS and an mmWave BS are collocated and a UE has capability of accessing both a legacy connection and an mmWave connection. Moreover, if data is transmitted in mmWave DL, the UE transmits HARQ feedback in mmWave UL to an mmWave BS.

In doing so, the mmWave BS can consistently measure an mmWave UL transmission state using a UL Reference Signal (RS) from the UE. If a UL channel state measured using the UL reference signal transmitted to the mmWave BS from the UE becomes smaller than a threshold, the mmWave BS determines to use a legacy UL instead of an mmWave UL [1310]. Hence, the mmWave BS instructs the UE to perform a UL feedback transmitting process through the legacy UL. Simultaneously, the mmWave BS instructs the UE to shorten a TTI of the legacy UL by a TTI of the mmWave UL [1320]. Hence, it is able to maintain a target data achievement rate of the mmWave DL. According to such a process, mmWave ACK/NACK can be transmitted to the mmWave BS at a preset mmWave transmission timing through a shortened TTI of the legacy UL.

Subsequently, while communication is performed in mmWave DL link and legacy UL, if the mmWave BS determines that an mmWave UL channel measured using the UL RS becomes good sufficiently, the mmWave BS determines to perform communication using the mmWave link and the mmWave DL [1330].

Figure 14:
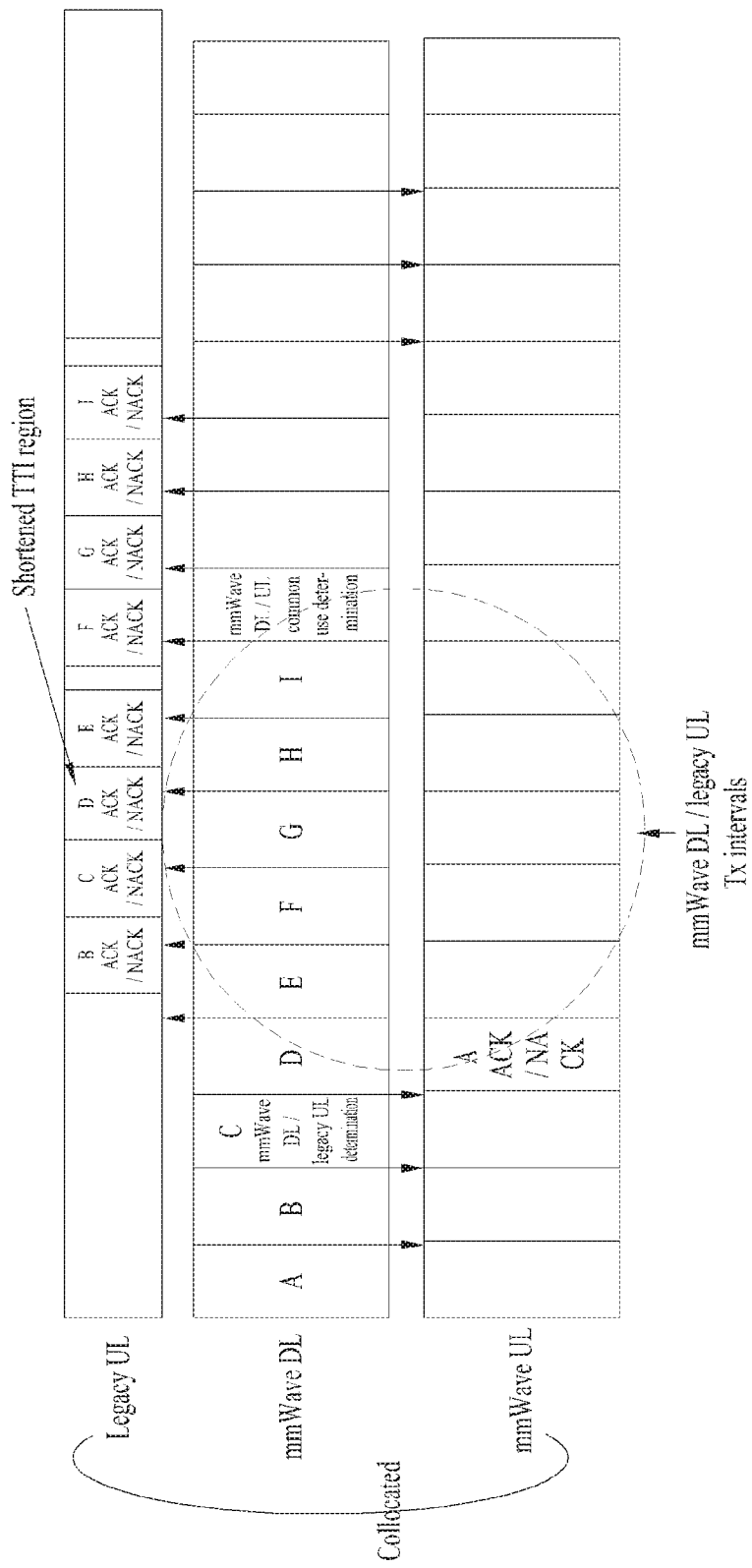
FIG. 14 illustrates an example of mmWave DL and legacy UL transmissions according to a legacy TTI shortening process.

FIG. 14 illustrates an example of mmWave DL and legacy UL transmissions according to a legacy TTI shortening process. With reference to FIG. 14, the method proposed in FIG. 13 is described by taking a detailed example and a case of implementing a legacy TTI and an mmWave TTI as 1 ms and 0.22 ms, respectively is described as well.

Referring to FIG. 14, considering a processing time (3 TTIs) of a UE, ACK/NACK for a data block A is transmitted in mmWave UL but ACK/NACK for data blocks B to F is transmitted in legacy UL. In doing so, as ACK/NACK for data blocks G, H and I is transmitted after a timing of determining that mmWave UL is used, it can be transmitted through the mmWave UL. On the other hand, considering that the legacy UL is already configured stably, it may be transmitted through the legacy UL as well.

Figure 15:
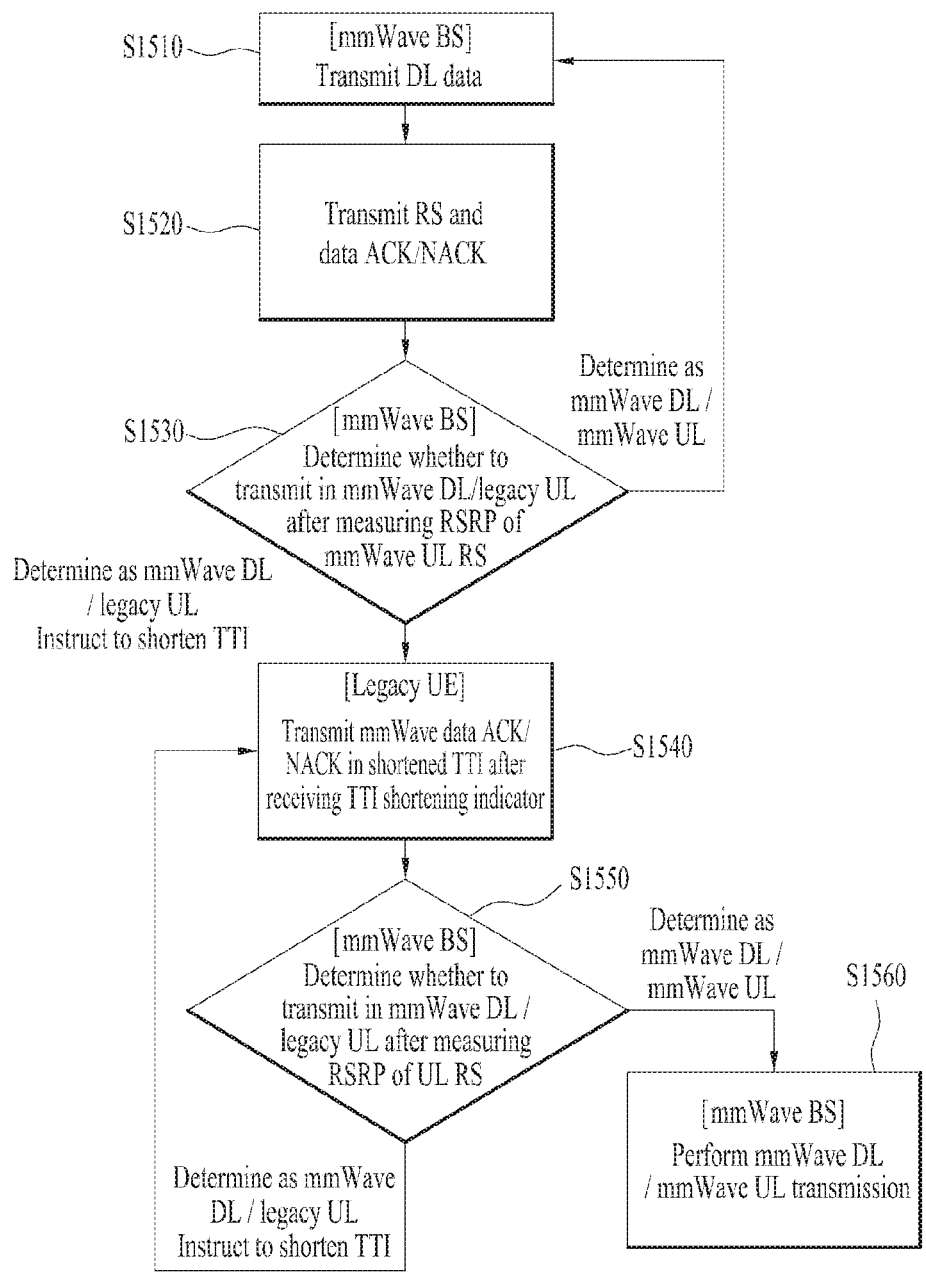
FIG. 15 is a flowchart of a proposed UL communication method.

FIG. 15 is a flowchart of the UL communication method described with reference to FIG. 13 or FIG. 14.

First of all, an mmWave BS transmits data to a UE through an mmWave DL [S1510]. The UE having received the DL data transmits ACK/NACK feedback for data through an mmWave UL and a UL reference signal may be transmitted together with the ACK/NACK feedback [S1520].

Having received the ACK/NACK feedback and the UL reference signal, the mmWave BS measures UL RSRP using the reference signal and determines whether to use a legacy UL together with the mmWave DL [S1530]. Namely, the mmWave BS determines whether a channel state of the mmWave UL is good sufficiently. As the channel state is good sufficiently, if it is determined to use the mmWave DL and the mmWave UL, the routine goes back to the step S1510 to continue the communication through the mmWave UL/DL.

On the other hand, if it is determined to use the legacy UL together with the mmWave DL, the routine goes to a step S1540. Namely, the mmWave BS instructs the UE to shorten a legacy TTI to match up with an mmWave TTI. Hence, having received an indicator instructing to shorten TTI, the UE transmits ACK/NACK feedback for mmWave DL data in legacy UL through the shortened legacy TTI [S1540]. So to speak, communication using the mmWave DL and the legacy UL is performed.

In some implementations, the indicator mentioned in the step S1540 may include a virtual ID of the UE as identification information on the UE and a flag indicating to shorten the TTI. Moreover, the indicator may further include information on a length of the mmWave TTI in addition to the above-described information. The information on the length of the mmWave TTI may be transmitted to UE in advance through a legacy SIB and also transmitted to the UE in a manner of being included together in the indicator instructing to shorten the legacy TTI to match up with the mmWave TTI. The relationship between the length of the mmWave TTI and the length of the legacy TTI shall be described in detail with reference to FIGS. 16 to 18.

The mmWave BS determines whether to continue to perform UL transmission using the legacy UL in the course of measuring RSRP by receiving the UL reference signal from the UE [S1550]. If it is determined to continue to use the legacy UL in the step S1550, the mmWave BS transmits an indicator, which instructs the UE to shorten the legacy TTI, to the UE and goes back to the step S1540. In doing so, the step of transmitting the indicator instructing to shorten the legacy TTI may be skipped.

On the contrary, if the mmWave BS determines to use the mmWave UL, the mmWave BS instructs the UE to use the mmWave UL again. Subsequently, the mmWave BS performs communication with the UE using the mmWave DL and the mmWave UL [S1560].

Figure 16:
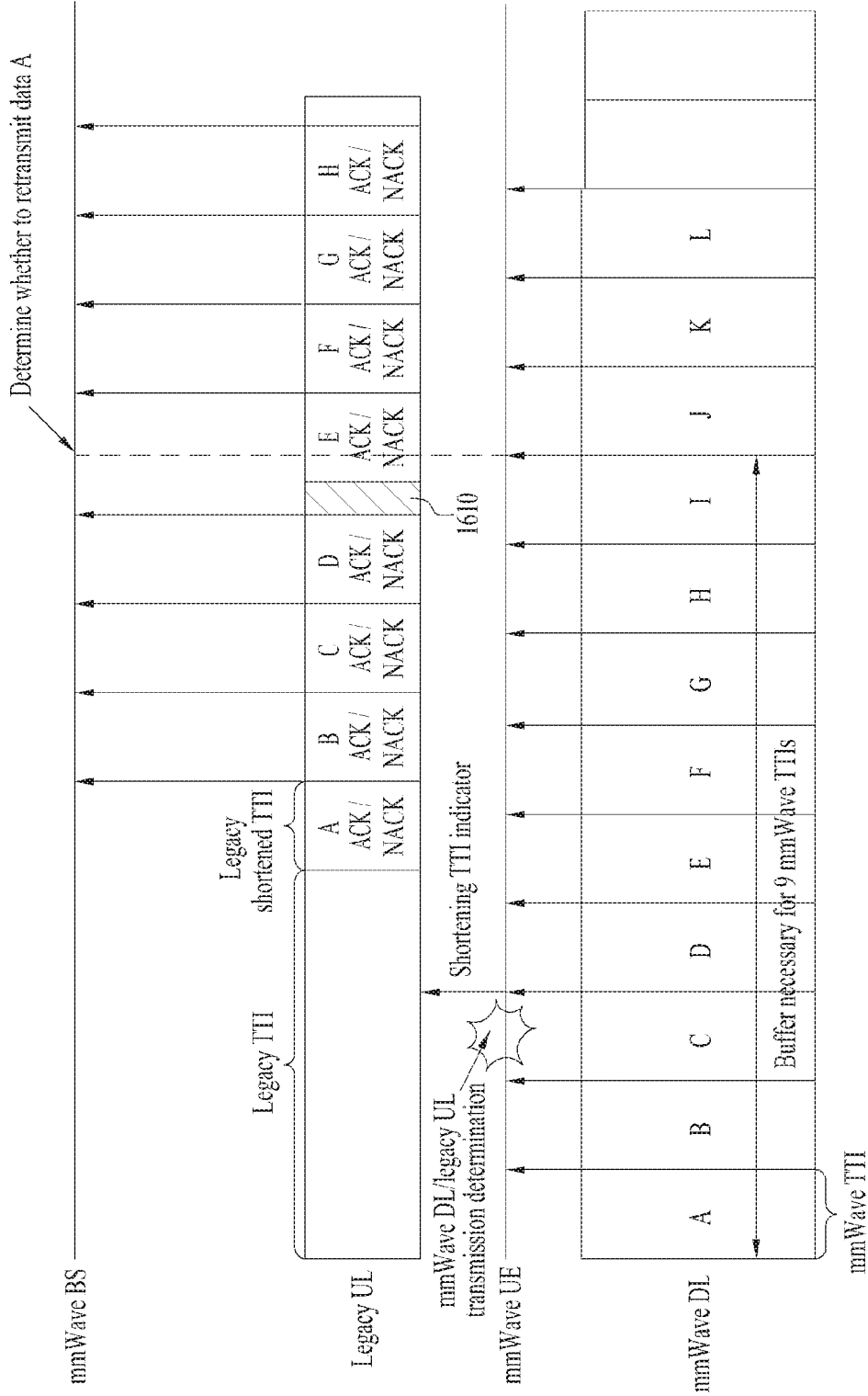
FIGS. 16 to 18 illustrate a process for adjusting a legacy TTI according to another proposed embodiment.
Figure 17:
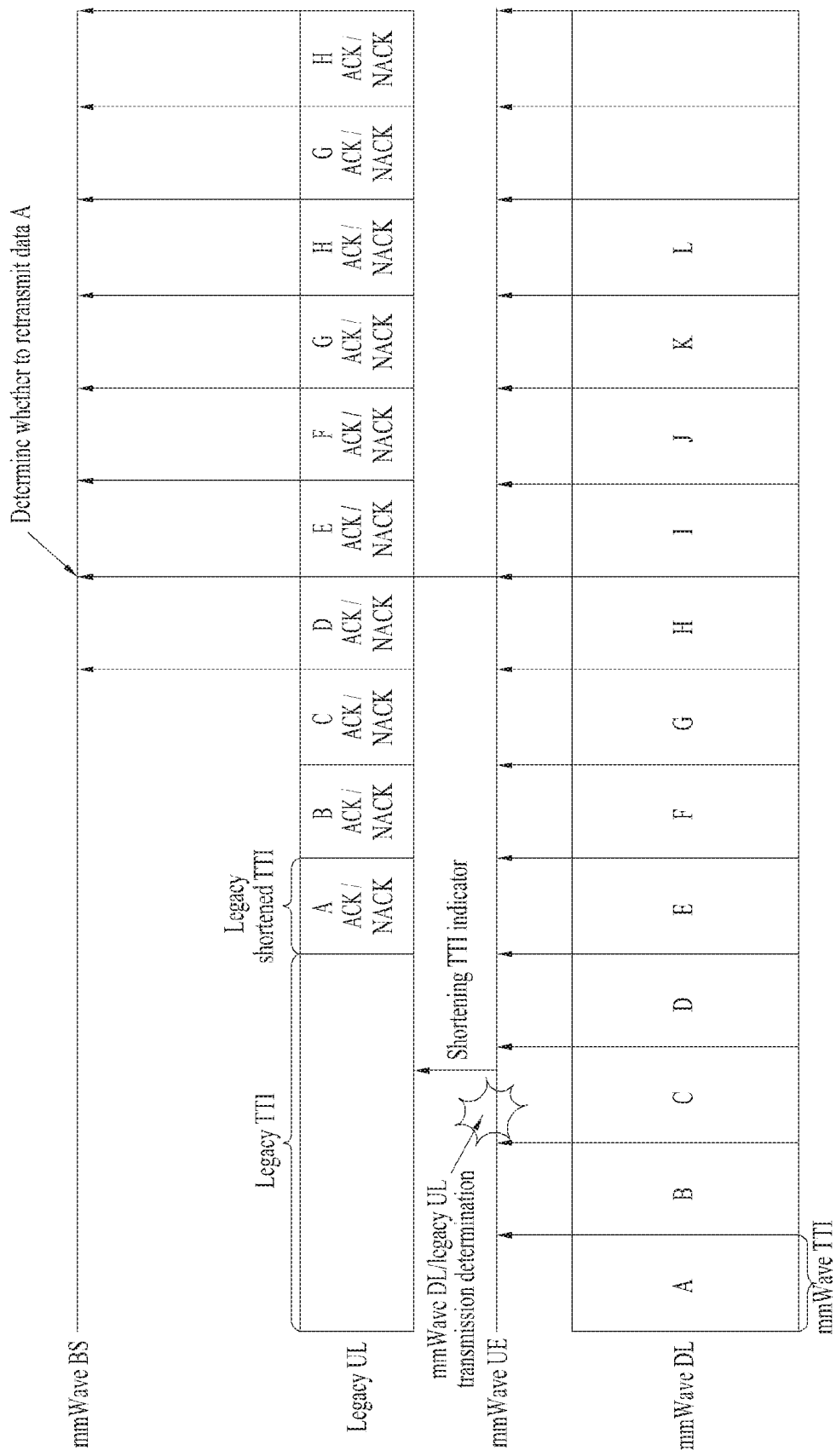
Figure 18:
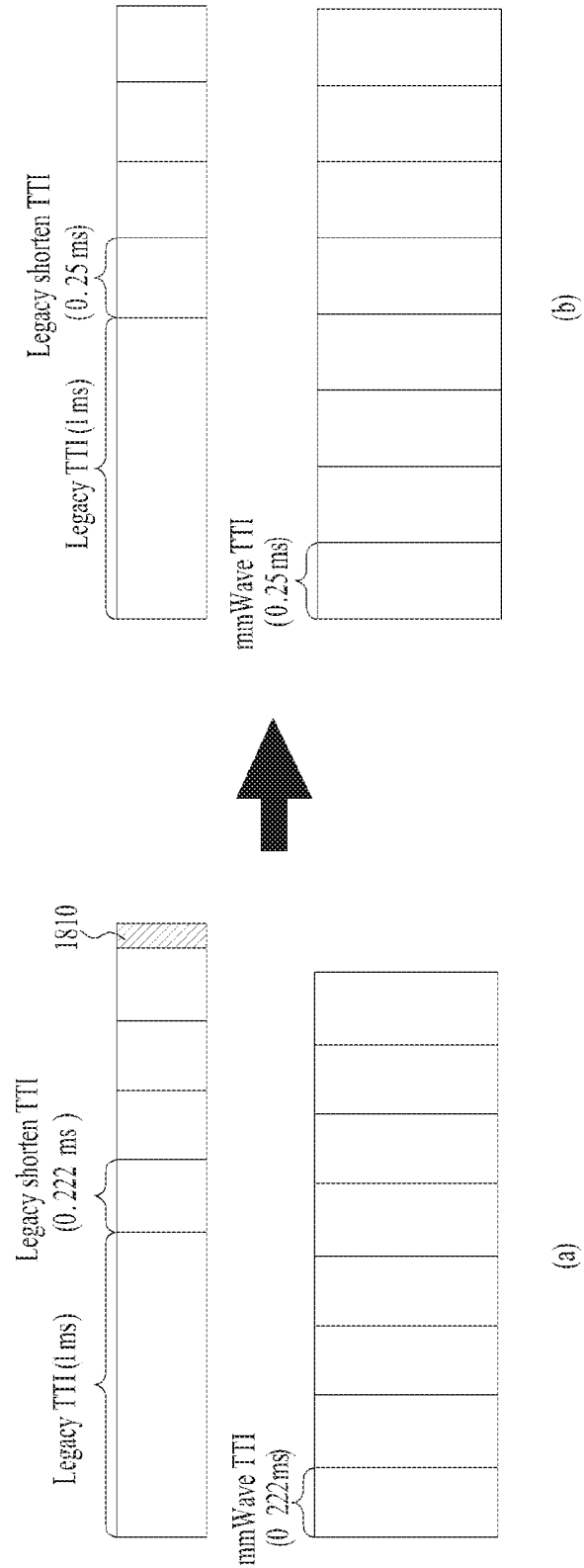

FIGS. 16 to 18 illustrate a process for adjusting a legacy TTI according to another proposed embodiment. With reference to FIGS. 16 to 18, a method of designing an mmWave TTI in the course of adjusting a legacy TTI is described.

In FIG. 16, a case that the number of HARQ processes is 8 TTIs is taken as an example. As described in the foregoing example, if a legacy TTI and an mmWave TTI are implemented as 1 ms and 0.22 ms, respectively, a length of the legacy TTI fails to become an integer multiple of a length of the mmWave TTI. Namely, sine the lengths between TTIs fail to match each other, the blank of some resource regions is generated like a slashed region 1610 shown in FIG. 16. Hence, since a buffer for 9 mmWave TTIs are required due to the region 1610 despite a case that the number of HARQ processes is 8, it causes a problem that a maximum buffer size configured for a system is exceeded.

On the other hand, FIG. 17 shows a case that a legacy TTI and an mmWave TTI are implemented as 1 ms and 0.25 ms, respectively. Namely, FIG. 17 shows a case that an mmWave TTI is implemented so that a length of the legacy TTI becomes an integer multiple ($NT_{mmW}=T_{legacy}$, where N is an integer) of a length of the mmWave TTI. In case of the implementation like FIG. 17, although the legacy TTI is shortened by the mmWave TTI, the blank like the region 1610 of FIG. 16 is not generated. Hence, the problem of exceeding the maximum buffer size configured for the mmWave system is not caused. In case that the mmWave TTI is implemented so as to make the legacy TTI become an integer multiple of the mmWave TTI, as the mmWave TTI length increases in comparison with the case of FIG. 16, a slight data loss may be generated (e.g., reduction to 1/0.25 from 1/0.222). Yet, as two connections are collocated, since it is an already-synchronized situation, complexity and resource use efficiency of an ACK/NACK feedback transmitting process are raised.

FIG. 18 shows comparison between FIG. 16 and FIG. 17. In case of implementing an mmWave TTI so that a legacy TTI does not become an integer multiple of the mmWave TTI, as shown in FIG. 18(a), it may be difficult to process a region 1810. Moreover, it may cause a problem that a maximum buffer size configured for a maximum mmWave system is exceeded as well. On the contrary, if an mmWave TTI is implemented so that a legacy TTI becomes an integer multiple of the mmWave TTI, as shown in FIG. 18(b), a resource region may not be wasted and implementation complexity may be lowered.

Figure 19:
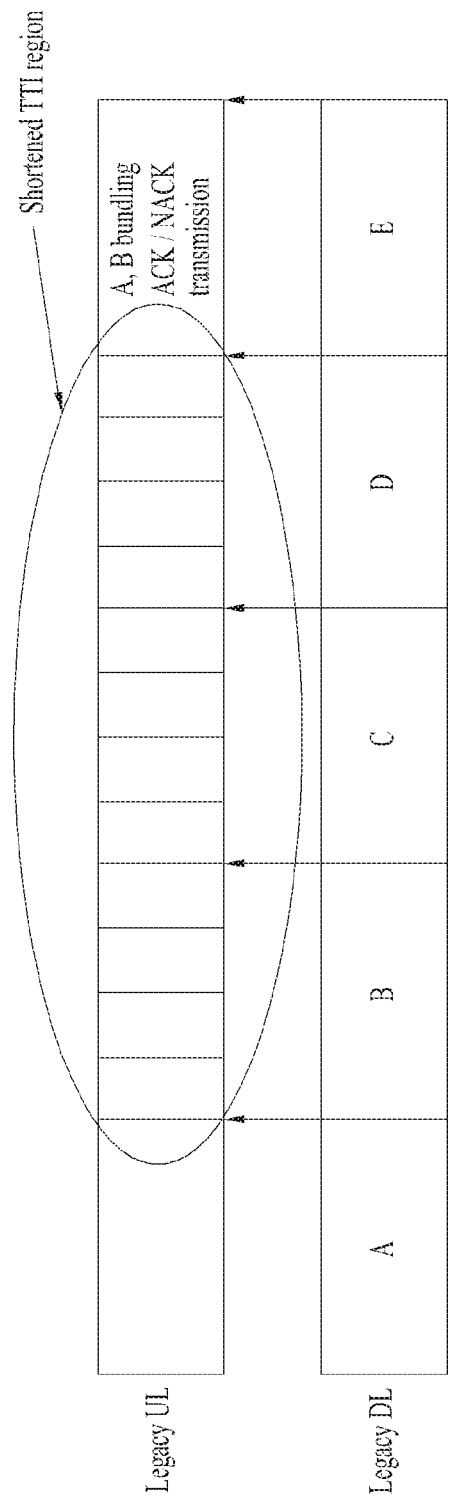
FIG. 19 illustrates a legacy system complementing process in case that a legacy UL resource is lost due to a shortened TTI.

FIG. 19 illustrates a legacy system complementing process in case that a legacy UL resource is lost due to a shortened TTI. As described above, in case that a UE transmits feedback for an mmWave DL through a legacy UL using a shortened legacy TTI instead of an mmWave UL, a timing of transmitting feedback for a legacy DL may be delayed. Namely, as shown in FIG. 19, if the legacy UL is utilized as a shortened TTI instead of the mmWave UL at the original transmission timings for data blocks A, B, C and D of the legacy DL, the transmission timings for the data blocks A to D may be changed.

In such a case, the UE bundles ACK/NACK for the legacy DL and then transmits the bundled ACK/NACK through the legacy UL. Namely, if the legacy DL is received in the course of transmitting the mmWave UL using the shortened legacy TTI, the UE bundles and transmits ACK/NACK of the legacy DL through the legacy UL as soon as the shortened legacy TTI time interval ends. As shown in FIG. 19, ACK/NACK for data blocks A and B may be transmitted to a BS through the legacy UL by being bundled in a single legacy TTI, and ACK/NACK for three or more data blocks may be transmitted at a time by being bundled together.

4. Device Configuration

Figure 20:
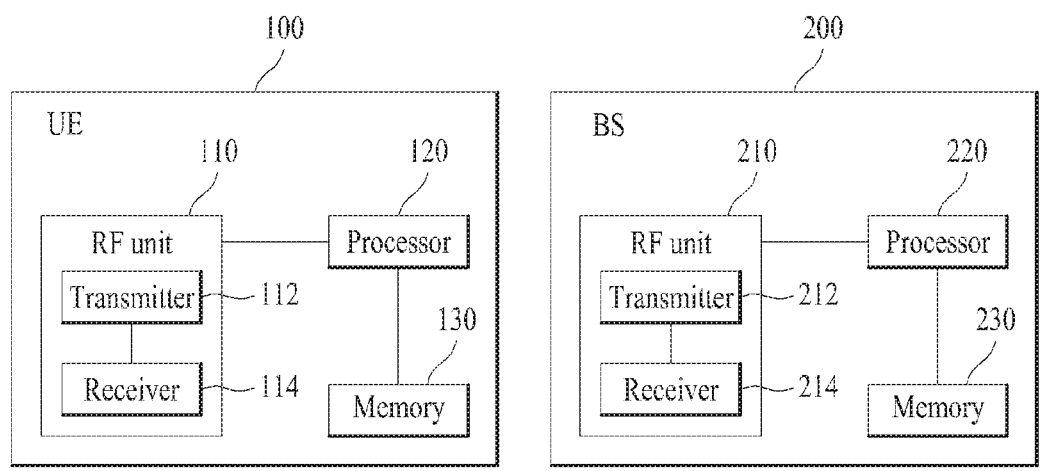
FIG. 20 is a diagram illustrating a configuration of a User Equipment (UE) and a Base Station (BS) related to a proposed embodiment.

FIG. 20 is a block diagram showing the configuration of a user equipment and a base station according to one embodiment of the present invention. In FIG. 20, the user equipment 100 and the base station 200 may include radio frequency (RF) units 110 and 210, processors 120 and 220 and memories 130 and 230, respectively. Although a 1:1 communication environment between the user equipment 100 and the base station 200 is shown in FIG. 20, a communication environment may be established between a plurality of user equipment and the base station. In addition, the base station 200 shown in FIG. 20 is applicable to a macro cell base station and a small cell base station.

The RF units 110 and 210 may include transmitters 112 and 212 and receivers 114 and 214, respectively. The transmitter 112 and the receiver 114 of the user equipment 100 are configured to transmit and receive signals to and from the base station 200 and other reception modules and the processor 120 is functionally connected to the transmitter 112 and the receiver 114 to control a process of, at the transmitter 112 and the receiver 114, transmitting and receiving signals to and from other apparatuses. The processor 120 processes a signal to be transmitted, sends the processed signal to the transmitter 112 and processes a signal received by the receiver 114.

If necessary, the processor 120 may store information included in an exchanged message in the memory 130. By this structure, the user equipment 100 may perform the methods of the various embodiments of the present invention.

The transmitter 212 and the receiver 214 of the base station 200 are configured to transmit and receive signals to and from another base station and user equipments and the processor 220 are functionally connected to the transmitter 212 and the receiver 214 to control a process of, at the transmitter 212 and the receiver 214, transmitting and receiving signals to and from other apparatuses. The processor 220 processes a signal to be transmitted, sends the processed signal to the transmitter 212 and processes a signal received by the receiver 214. If necessary, the processor 220 may store information included in an exchanged message in the memory 230. By this structure, the base station 200 may perform the methods of the various embodiments of the present invention.

The processors 120 and 220 of the user equipment 100 and the base station 200 instruct (for example, control, adjust, or manage) the operations of the user equipment 100 and the base station 200, respectively. The processors 120 and 220 may be connected to the memories 130 and 230 for storing program code and data, respectively. The memories 130 and 230 are respectively connected to the processors 120 and 220 so as to store operating systems, applications and general files.

The processors 120 and 220 of the present invention may be called controllers, microcontrollers, microprocessors, microcomputers, etc. The processors 120 and 220 may be implemented by hardware, firmware, software, or a combination thereof.

If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 120 and 220.

Meanwhile, the aforementioned method can be written as computer programs and can be implemented in general-use digital computers that execute the programs using a computer readable recording medium. And, a data structure used for the aforementioned method can be recorded by various means in a computer-readable media. Program storing devices usable for explaining a storing device, which includes an executable computer code configured to perform various methods of the present invention, should not be understood as a device including such temporary objects as carrier waves and signals. The computer-readable media includes such a storing media as a magnetic storing media (e.g., a ROM, a floppy disk, a hard disk and the like) and an optical reading media (e.g., a CD-ROM, a DVD and the like).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The aforementioned UL communication method in the mmWave system is applicable to various wireless communication systems including an IEEE 802.16x system and an IEEE 802.11x system as well as to a 3GPP system.

What is claimed is:

1. A method of performing uplink communication by a user equipment supportive of an mmWave communication system, the method comprising:
receiving data via an mmWave downlink from an mmWave base station;
transmitting an ACKnowledgement/Negative ACK (ACK/NACK) response for the data and an mmWave uplink reference signal to the mmWave base station via an mmWave uplink;
receiving an indicator indicating to use a legacy uplink instead of the mmWave uplink from the mmWave base station;
shortening a length of a legacy Transmission Time Interval (TTI) to match up with a length of an mmWave TTI according to the indicator; and
performing communication with the mmWave base station via the legacy uplink using the shortened legacy TTI,
wherein an ACK/NACK response for legacy downlink data received in the course of performing the uplink communication using the shortened legacy TTI is transmitted by being bundled after ending a use of the shortened legacy TTI, and wherein the indicator comprises a virtual ID of the user equipment, a flag indicating to use the legacy uplink, a flag indicating to shorten the legacy TTI, and information on the length of the mmWave TTI.

2. The method of claim 1, wherein the legacy uplink is used according to a channel state of the mmWave uplink measured by the mmWave base station using the mmWave uplink reference signal.

3. The method of claim 1, wherein the mmWave base station is collocated with a legacy base station, and
wherein the user equipment has capability of accessing both a connection to the mmWave base station and a connection to the legacy base station.

4. The method of claim 1, wherein the mmWave TTI is implemented to be an integer multiple of the length of the mmWave TTI.

5. A user equipment supportive of an mmWave communication system, the user equipment comprising:
a transmitter;
a receiver; and
a processor configured to operate by being connected to the transmitter and the receiver,
wherein the processor is further configured to:
control the receiver to receive data via an mmWave downlink from an mmWave base station;
control the transmitter to transmit an ACKnowledgement/Negative ACK (ACK/NACK) response for the data and an mmWave uplink reference signal to the mmWave base station via an mmWave uplink;
control the receiver to receive an indicator indicating to use a legacy uplink instead of the mmWave uplink from the mmWave base station;
shorten a length of a legacy Transmission Time Interval (TTI) to match up with a length of an mmWave TTI according to the indicator; and
control the transmitter and the receiver to perform communication with the mmWave base station via the legacy uplink using the shortened legacy TTI,
wherein an ACK/NACK response for legacy downlink data received in the course of performing the uplink communication using the shortened legacy TTI is transmitted by being bundled after ending a use of the shortened legacy TTI, and
wherein the indicator comprises a virtual ID of the user equipment, a flag indicating to use the legacy uplink, a flag indicating to shorten the legacy TTI, and information on the length of the mmWave TTI.

6. The user equipment of claim 5, wherein the legacy uplink is used according to a channel state of the mmWave uplink measured by the mmWave base station using the mmWave uplink reference signal.

7. The user equipment of claim 5, wherein the mmWave base station is collocated with a legacy base station, and
wherein the user equipment has capability of accessing both a connection to the mmWave base station and a connection to the legacy base station.

8. The user equipment of claim 5, wherein the mmWave TTI is implemented to be an integer multiple of the length of the mmWave TTI.

* * * * *